(12) United States Patent
Cirette et al.

(10) Patent No.: US 9,227,345 B2
(45) Date of Patent: Jan. 5, 2016

(54) CONTAINER MANUFACTURING PLANT COMPRISING A ROBOT POSITIONED TO OPERATE ON AT LEAST TWO UNITS

(71) Applicants: Damien Cirette, Octeville sur Mer (FR); Eric Meunier, Octeville sur Mer (FR); Denis Bischoff, Octeville sur Mer (FR); Julien Auger, Octeville sur Mer (FR)

(72) Inventors: Damien Cirette, Octeville sur Mer (FR); Eric Meunier, Octeville sur Mer (FR); Denis Bischoff, Octeville sur Mer (FR); Julien Auger, Octeville sur Mer (FR)

(73) Assignee: SIDEL PARTICIPATIONS, Octeville sur Mer (FR)

( * ) Notice: Subject to any disclaimer, the term of this patent is extended or adjusted under 35 U.S.C. 154(b) by 0 days.

(21) Appl. No.: 14/402,863

(22) PCT Filed: May 16, 2013

(86) PCT No.: PCT/EP2013/060137
§ 371 (c)(1),
(2) Date: Nov. 21, 2014

(87) PCT Pub. No.: WO2013/174711
PCT Pub. Date: Nov. 28, 2013

(65) Prior Publication Data
US 2015/0151455 A1    Jun. 4, 2015

(30) Foreign Application Priority Data
May 21, 2012 (FR) ...................................... 12 54610

(51) Int. Cl.
*B29C 31/00* (2006.01)
*B29C 49/48* (2006.01)
(Continued)

(52) U.S. Cl.
CPC ............... *B29C 31/006* (2013.01); *B29C 49/28* (2013.01); *B29C 49/42* (2013.01);
(Continued)

(58) Field of Classification Search
CPC .. B29C 31/006; B29C 49/42; B29C 49/4205; B29C 2049/4856
See application file for complete search history.

(56) References Cited

U.S. PATENT DOCUMENTS 7,284,778 B1    10/2007  Pellegatta
8,033,809 B2 *  10/2011  Christiansen ........... B29C 49/42
                                                       425/182

(Continued)

FOREIGN PATENT DOCUMENTS

DE    WO 2013060549 A1 *  5/2013 .............. B29C 49/42
FR    1 251 155 A         1/1961
(Continued)

OTHER PUBLICATIONS

International Search Report, dated Aug. 13, 2013, from corresponding PCT application.

*Primary Examiner* — Robert B Davis
(74) *Attorney, Agent, or Firm* — Young & Thompson

(57) ABSTRACT

A plant (10) for manufacturing containers (12) from thermoplastic preforms (16), the plant (10) including at least:—a first unit (12) for thermally conditioning the preforms (16) which includes a first vertical lateral face (F1); and—a second unit (14) for shaping the containers (24) from the preforms (16) which have been thermally conditioned in the first unit (12), the second unit including a second vertical lateral face (F2); characterized in that the plant (10) includes at least one robot (50) which faces the first vertical lateral face (F1) and the second vertical lateral face (F2) in order to selectively operate through the first vertical lateral face (F1) and/or through the second vertical lateral face (F2) to carry out operations on the first unit (12) and/or the second unit (14).

10 Claims, 3 Drawing Sheets

(51) Int. Cl.
*B29C 49/42* (2006.01)
*B29C 49/28* (2006.01)
*B29C 49/64* (2006.01)
*B29L 31/00* (2006.01)

(52) U.S. Cl.
CPC ........ *B29C 49/4205* (2013.01); *B29C 49/6409* (2013.01); *B29C 2049/4856* (2013.01); *B29C 2791/007* (2013.01); *B29L 2031/712* (2013.01)

(56) References Cited

U.S. PATENT DOCUMENTS

| | | | | |
|---|---|---|---|---|
| 8,069,545 B2 * | 12/2011 | Stoiber | ................... | B29C 49/42 29/401.1 |
| 8,491,293 B2 * | 7/2013 | Meinzinger | ........... | B29C 31/006 29/401.1 |
| 8,770,957 B2 * | 7/2014 | Laumer | ................... | B29C 49/46 29/401.1 |
| 8,807,981 B2 * | 8/2014 | Cirette | ................... | B29C 49/42 425/195 |
| 8,974,211 B2 * | 3/2015 | Cirette | .................. | B29C 31/006 425/182 |
| 2011/0052744 A1 | 3/2011 | Meinzinger et al. | | |
| 2013/0211575 A1 * | 8/2013 | Hahn | ...................... | B29C 49/42 700/179 |
| 2014/0305076 A1 * | 10/2014 | Winzinger | .............. | B29C 49/42 53/201 |

FOREIGN PATENT DOCUMENTS

| | | | | |
|---|---|---|---|---|
| FR | WO 2012120031 A1 * | 9/2012 | ............ | B29C 31/006 |
| WO | 00/48819 A1 | 8/2000 | | |

\* cited by examiner

CONTAINER MANUFACTURING PLANT COMPRISING A ROBOT POSITIONED TO OPERATE ON AT LEAST TWO UNITS

This invention relates to an installation for the production of containers comprising a robot placed to act on at least two units of the installation.

This invention relates more particularly to an installation for the production of containers from preforms of thermoplastic material, said installation comprising at least:
- a first unit for thermal conditioning of the preforms that comprises a first vertical lateral face; and
- a second unit for forming containers from said thermally-conditioned preforms in the first unit, which comprises a second vertical lateral face.

From the state of the art, such installations are known for producing containers, in particular bottles of thermoplastic material, comprising successively at least two units respectively for thermal conditioning and for forming, particularly by injection at least of a fluid under pressure.

Generally, it is sought to reduce the time during which the installation is in the operating mode known as servicing so as to permit the introduction particularly of operations for maintenance or for changing tools, such as molds.

Such, in particular, will be the case for starting the production of a new container. Actually, it is then necessary to initiate different operations for changing certain of the means that are associated with a given preform, itself corresponding to a well-determined container to be produced.

However, such a solution has not been satisfactory because the total time necessary to perform such operations is particularly long and consequently costly since generally all production ceases.

To remedy this, the Applicant has developed an entire set of new solutions to automate the actions or handling that were until now performed manually by at least one operator.

The Applicant thus proposes a production installation in which the operations necessary to perform a change in the molds are automated.

Within the framework of the development of these solutions, the Applicant has sought to optimize both the utilization of the means used to automate operations and their integration into the installation and to maintain in particular their general space requirement in relation to the industrial placement.

The object of this invention is particularly to propose a new concept of installation that integrates means for automating certain operations.

For this purpose, the invention proposes an installation of the type previously described, characterized in that the installation comprises at least one robot that is placed opposite the first vertical lateral face and opposite the second vertical lateral face to act selectively through the first vertical lateral face and/or through the second vertical lateral face so as to perform operations on the first unit and/or the second unit.

Advantageously, said at least one robot is placed between the first unit and the second unit, juxtaposed with said first and second units.

Thanks to such an arrangement, the robot is particularly— but not exclusively—able to act on both of said units, in particular to perform operations such as for changes in tools or for maintenance.

Advantageously, the general compactness of the installation is maintained thanks to the placement of said at least one robot in a placement area that, being proximal, is next to said first and second units.

According to other characteristics of the invention:
- said at least one robot comprises at least first means to help with the operations for changing support means of the preforms belonging to the first unit;
- said at least one robot comprises at least second means to help with the operations for changing molding means belonging to the second unit;
- said at least one robot comprises a hinged arm that is mobile in the space in accordance with a trihedron;
- said first means and/or second means of said at least one robot are controlled selectively to perform automatically said operations for changing the molding means and/or said operations for changing the support means of the preforms;
- the first vertical lateral face and the second vertical lateral face extend into the extension of one another;
- the first vertical lateral face is the external face of one of the vertical walls of an enclosure surrounding said first unit, and the first vertical lateral face comprises closing means that are mounted to move between a closed position and an open position, to clear selectively at least one opening making possible the action of said at least one robot on the first unit;
- the second vertical lateral face is the external face of one of the vertical walls of an enclosure surrounding said second unit, and the second vertical lateral face comprises closing means that are mounted to move between a closed position and an open position to clear selectively at least one opening making possible the action of said at least one robot on the second unit;
- said at least one robot is installed in an area delimited by an enclosure, said enclosure comprising at least said walls that comprise respectively the first vertical lateral face and the second vertical lateral face;
- said at least one robot is able to move opposite the first vertical lateral face and/or the second vertical lateral face.

Other characteristics and advantages of this invention will appear upon reading the detailed description that follows, for the understanding of which reference will be made to the drawings in which.

In the following description, the longitudinal, transverse and vertical orientations will be adopted in a nonlimiting way with reference to the trihedron (X, Y, Z) represented in the figures.

Also in a nonlimiting way, the terms "front" and "rear" will be used with reference to the longitudinal orientation, as well as "upper" and "lower" with reference to the vertical orientation, and finally "left" or "right" with reference to the transverse orientation.

Figure 1:
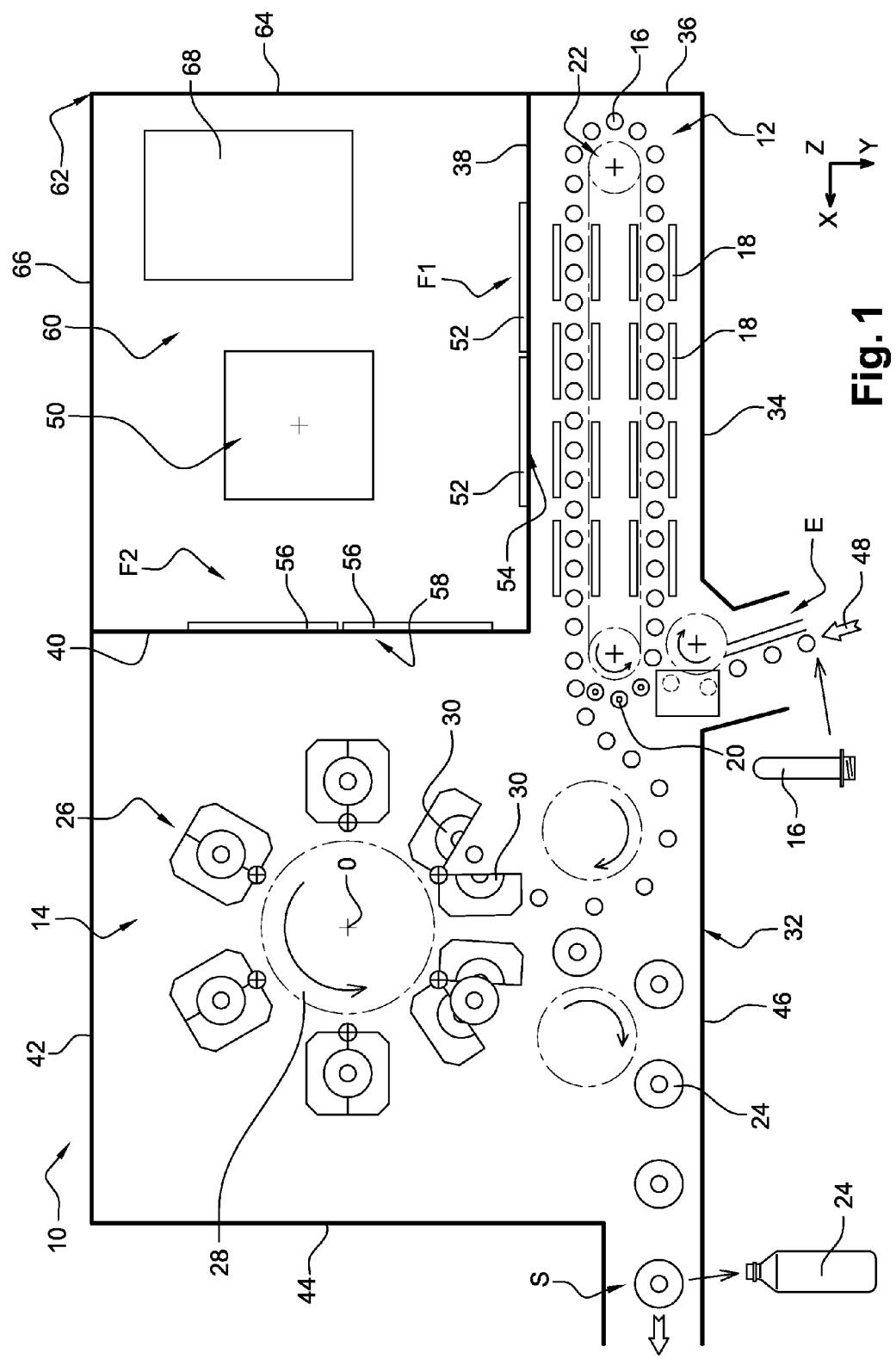
FIG. 1 is a top view that represents diagrammatically an installation consistent with the state of the art comprising a first unit and a second unit and at least one robot placed according to the teachings of the invention.

Shown diagrammatically in FIG. 1 is an example of installation 10 for producing containers comprising at least a first unit 12 for the thermal conditioning of the preforms, and then a second unit 14 for the forming of the containers.

The first unit 12 for the thermal conditioning of the preforms 16 of thermoplastic material consists of, for example, an oven exhibiting a "U"-shaped heating path.

The oven 12 comprises heating means 18, such as infrared lamps, which are placed along at least one part of the path and which are associated with cooling means (not shown) of the body and/or of the neck of the preforms.

In such an oven 12, the preforms 16 are temporarily transported by support means 20 (also called "spinner") that work with the neck of the preforms and that are connected in movement to a transport device 22.

For further details about such support means, reference will be made to, for example, the document WO-00/48819.

The transport device 22 comprises, for example, at least one belt forming a closed loop onto which the support means 20 of the preforms 16 are added with attachment.

The preforms 16 thus move from the entrance of the oven 12 to its exit by following said heating path and by being preferably driven in rotation on itself by the support means 20, around their main axis of vertical orientation.

At least one portion of the support means 20 is therefore complementary to the preforms 16 and particularly to the geometric characteristics of the neck.

Now, each preform 16 corresponds to a given container 24, to each container to produce its preform.

This is why, when it is desired to change the type of container produced, it is generally necessary to initiate operations of disassembly of a portion of the support means 20 in place so as to mount new support means 20.

Likewise, in the second unit 14 for the forming of the containers 24 from preforms 16, operations are required when it is desired in particular to change the type of container.

The second unit 14 shown in FIG. 1 corresponds to a machine of the rotating type (also called "blower") that constitutes, however, only one nonlimiting example.

The second unit 14 comprises molding devices 26 that are distributed circumferentially in a uniform manner on the periphery of a carousel 28 designed to be driven in rotation around an axis O.

Each molding device 26 comprises molding means 30 and associated blowing or drawing-blowing means (not shown).

The molding means 30 comprise a mold comprising at least two mold elements in which the molding stamp of the container to be produced is accomplished in recess, said mold elements each being secured in a removable way to an associated mold carrier.

The molding means 30 generally comprise a separate mold bottom forming a third mold element.

The molding device 26, here of the "folding-wallet" type, is able to occupy an open position into which a preform 16 is introduced or a container 24 is withdrawn and a closed position is occupied during the forming.

Thus, when it is desired in particular to start the production of a new container, it is then necessary to initiate operations for changing the molding means 30 of the molding devices 26 of the second unit 14.

Advantageously, the installation 10 comprises an enclosure 32 having a part surrounding the first unit 12 and another surrounding the second unit 14, said enclosure 32 being in particular designed to isolate them from the outside environment.

Preferably, the enclosure 32 is associated with means for injection of filtered air so as to establish an overpressure inside the enclosure and to control the quality of the air.

The enclosure 32 comprises, around the first unit 12 for thermal conditioning, a vertical wall 34 with longitudinal orientation that, adjacent to the entering section of the "U"-shaped heating path, is extended by a vertical wall 36 with a transverse orientation, which is itself extended by a vertical wall 38 with a longitudinal orientation that is overall parallel to the wall 34 and adjacent to the return section of the heating path.

The enclosure 32 comprises mainly, around the forming second unit 14, a vertical wall 40 with a transverse orientation that extends the wall 38 that is associated with the first unit 12. The wall 40 is itself extended by a vertical wall 42 with a longitudinal orientation and further a vertical wall 44 with a transverse orientation.

The enclosure 32 comprises, crosswise and opposite the wall 42, a vertical wall 46 with a longitudinal orientation that is adjacent to transfer devices (or wheels) designed to ensure, on the one hand, the transfer of the thermally-conditioned preforms 16 from the exit of the oven 12 to the molding devices 26 of the second unit 14 (also called "blower") and, on the other hand, the transfer of the produced containers 24 toward the exit S of the installation 10.

An entry E is also made in the enclosure 32 between the walls 34 and 46 so as to allow the feeding of preforms 16 of the first unit 12 by a feeding device 48 shown diagrammatically by an arrow in FIG. 1.

The above-cited operations, from the change in the support means 20 equipping the first unit 12 to the change in the molding means 30 of the second unit 14, have been until now performed manually by an operator or operators.

However, such a solution has not been satisfactory because the total time necessary to perform such operations was particularly long and consequently costly.

This is why the Applicant has developed new solutions to automate numerous operations necessary for the functioning of the installation 10 and more particularly—but not exclusively—the operations for the change in tools such as the molding means 30 of a molding device 26.

According to the invention, the installation 10 comprises at least one robot 50 that is placed opposite a first vertical lateral face F1 of the first unit 12 and opposite a second vertical lateral face F2 of the second unit 14 to act selectively through the first vertical lateral face and/or through the second vertical lateral face.

Advantageously, said at least one robot 50 is able to perform operations on the first unit 12 and/or the second unit 14.

Thanks to such an arrangement, the robot 50 is able to act selectively both on the first unit 12 and on the second unit 14 since both are in the action radius of said robot 50 shown diagrammatically by a square in FIG. 1.

Advantageously, said at least one robot 50 is in particular able to perform operations on the first unit 12 and on the second unit 14.

Advantageously, the first vertical lateral face F1 and the second vertical lateral face F2 extend into the extension of one another.

Advantageously, the first vertical lateral face F1 is the external face of one 38 of the vertical walls of the enclosure 32 surrounding said first unit 12.

The vertical wall 38 with a longitudinal orientation is adjacent to the return section of the preforms 16 on the "U"-shaped heating path, before their transfer to the second unit 14 for forming of the preforms 16.

Advantageously, the first vertical lateral face F1 comprises closing means 52 that are mounted to move between a closed position and an open position, to clear selectively at least one opening 54 making possible the action of said at least one robot 50 on the first unit 12.

Preferably, the closing means 52 consist of at least two gates that retract, from the closed position to the open position, by sliding along the wall 38 so as to enable access through the opening 54.

As a variant, each gate of the closing means 52 is mounted to pivot around an axis with a vertical orientation.

Advantageously, the second vertical lateral face F2 is the external face of one 40 of the vertical walls of the portion of the enclosure 32 surrounding said second unit 14.

The first vertical lateral face F1 of the wall 38 of the enclosure 32 surrounding the first unit 12 and the second vertical lateral face F2 of the wall 40 of the enclosure 32 surrounding the second unit 14 extend into the extension of one another, the wall 38 being contiguous to the wall 40.

As illustrated in FIG. 1, the wall 38 and the wall 40 of the enclosure 32 are overall at right angles. However, the enclosure 32 according to FIG. 1 is only a nonlimiting example, and the angle formed by the intersection of the walls 38 and 40 comprising said faces F1 and F2 is also a function of the arrangement of the first unit 12 relative to the second unit 14.

The first vertical lateral face F1 of the wall 38 and the second vertical lateral face F2 of the wall 40 extend into the extension of one another and determine a given angle at their intersection.

Preferably, the angle between the faces F1 and F2 that is located on the side of the placement area of the robot 50 is a right angle, i.e., at 90°. As a variant, the angle between the faces F1 and F2 is less than or equal to 180° and, for example, with a value of 60° or 120° depending on the arrangement of said units 12 and 14 that are not aligned with one another.

Advantageously, the second vertical lateral face F2 comprises closing means 56 that are mounted to move between a closed position and an open position to clear selectively at least one opening 58 allowing the action of said at least one robot 50 on the second unit 14.

The closing means 56 are, for example, made in the form of gates, having, for example, opening/closing kinematics that are similar to those described previously for the closing means 52.

Advantageously, the control of the closing means 52 and/or of the closing means 56 is accomplished automatically by means of associated actuators to move selectively said closing means 52, 56 between the open and closed positions.

Advantageously, said at least one robot 50 is placed in an area 60 delimited by a secondary enclosure 62 comprising at least one vertical wall 64 with a transverse orientation and a vertical wall 66 with a longitudinal orientation.

Figure 2:
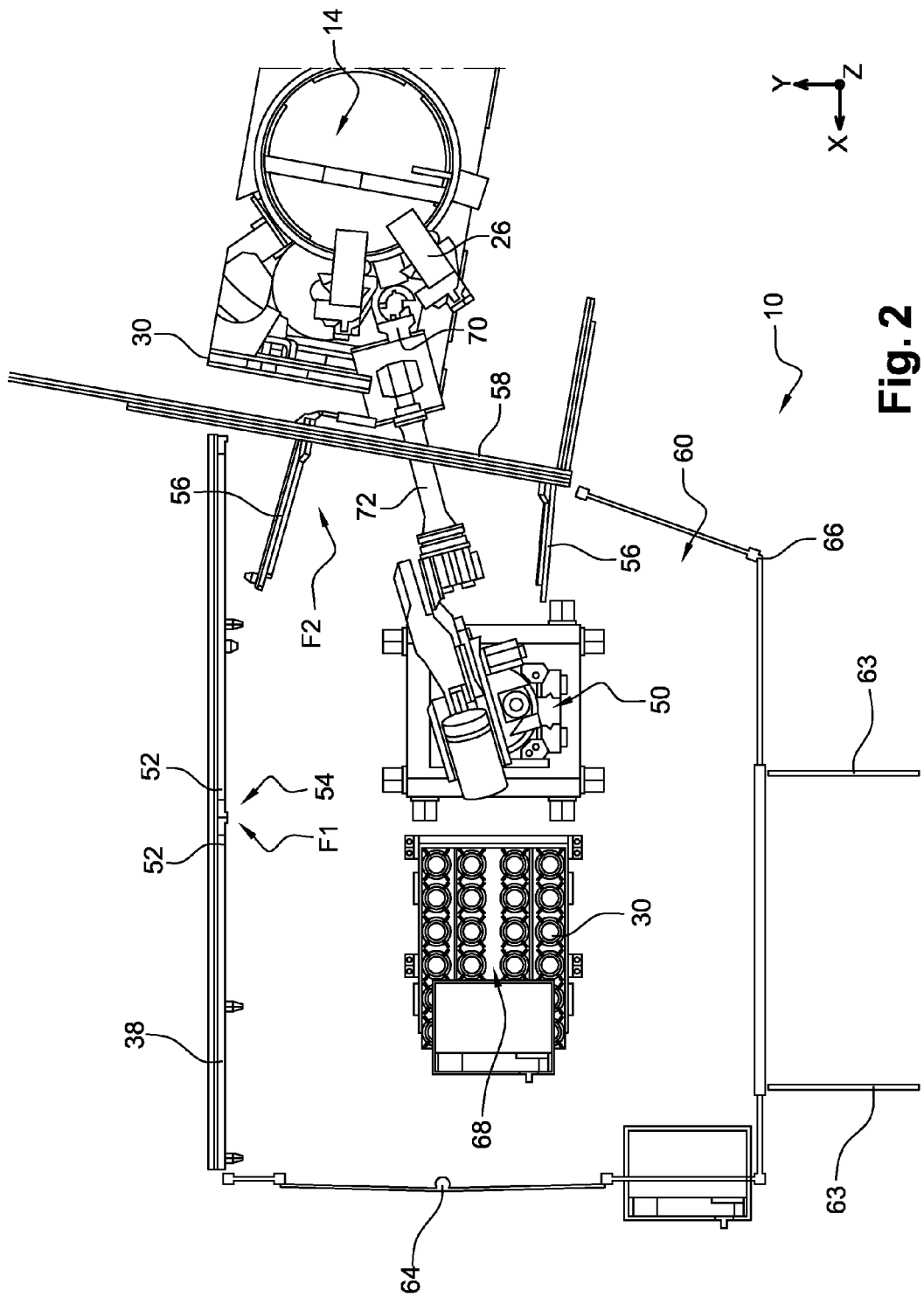
FIGS. 2 and 3 are respectively a top view and a view in perspective that show partially the diagrammed installation in FIG. 1 and that illustrate an example of use of the robot placed opposite said faces to act on the second unit and to perform automatically operations for mold changing.
Figure 3:
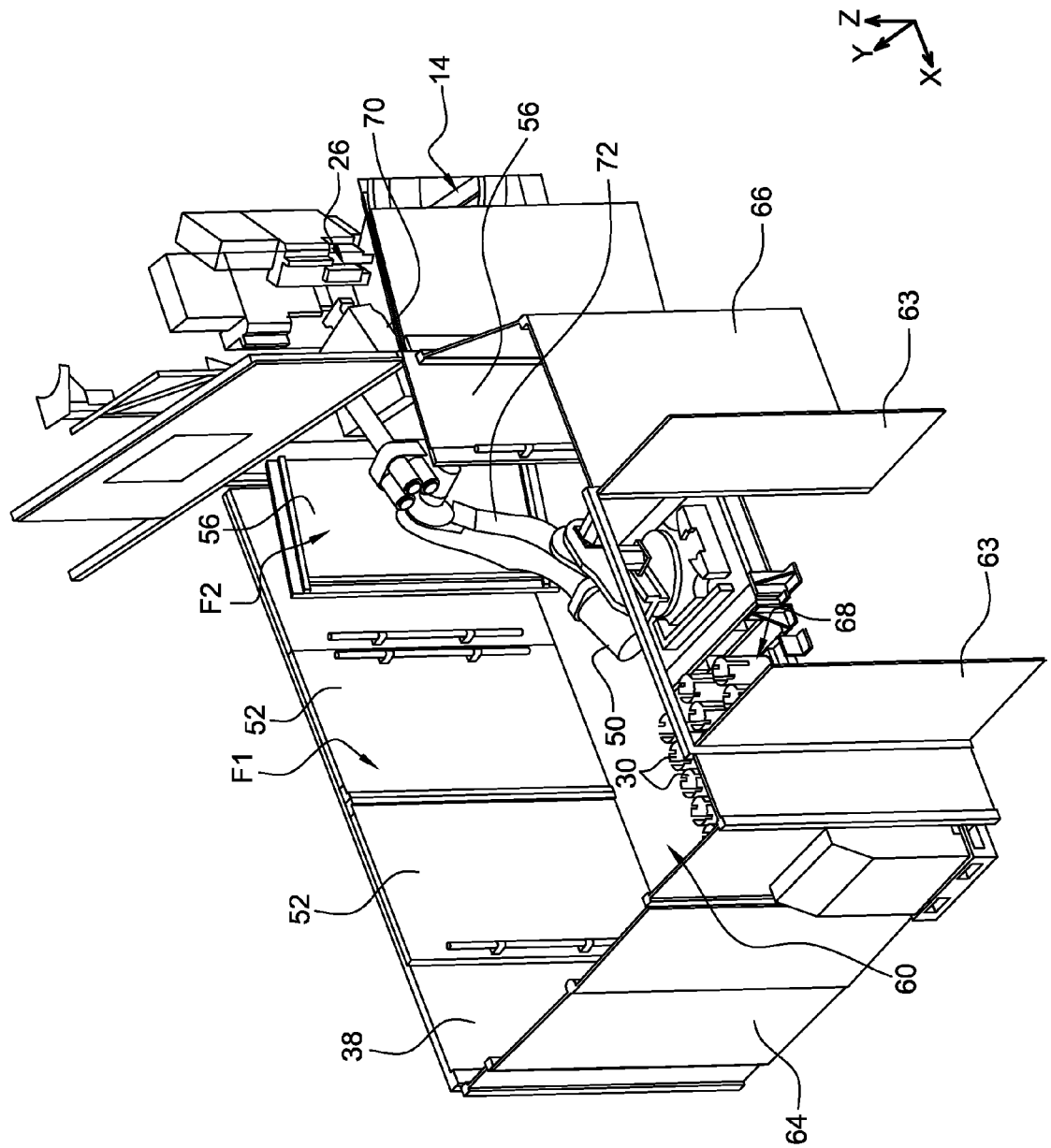

Advantageously, one of said walls 64, 66 comprises a gate 63 to enable access to the area 60 and that is more particularly visible in FIGS. 2 and 3.

For convenience, the gate 63 has been shown in open position so as in particular to make said area 60 visible in FIG. 3; it will be understood, however, that the gate 63 is advantageously closed when the robot 50 is in the process of acting, for example, on either of said units 12, 14.

The enclosure 62 that delimits the area 60 further comprises said walls 38 and 40 of the enclosure 32 of the installation 10, i.e., the walls that respectively comprise the first vertical lateral face F1 and the second vertical lateral face F2.

The enclosure 62 could not comprise the walls 64, 66 that in any case have the function of delimiting a safety perimeter around the robot 50 so as to control access to the area 60 and by so doing to avoid any accident with the robot 50 while operating.

Advantageously, the enclosure 62 makes it possible to isolate the area 60 and is associated with means for injecting filtered air so as to control the quality of the air surrounding the robot 50.

By controlling the quality of the air in the area 60 as in at least one of said first and second units 12, 14, any risk of contamination of the units 12 or 14 by pathogens (bacteria, viruses, fungi, etc.) that, present in the area 60, could be introduced there through the openings 54 or 58 is prevented.

Preferably, here the robot 50 is attached to the ground of the area 60.

As a variant, said at least one robot 50 is able to move opposite the first vertical lateral face F1 and/or the second vertical lateral face F2.

According to this variant, the robot 50 is, for example, mounted on a mobile carriage that can be moved into the placement area 60.

Advantageously, magazine-type storage means 68 are also placed with the robot 50 in the area 60 and comprise tools, for example molding means 30 and/or support means 20 intended to be changed.

Preferably, the installation 10 comprises a single robot 50 placed opposite said faces F1, F2 in the area 60, as a variant two robots 50.

Advantageously, the robot 50 is therefore used to perform various operations, particularly on one and/or the other of said units 12, 14.

Advantageously, said at least one robot 50 comprises at least first means (not shown) to help with the operations for changing support means 20 of the preforms 16 belonging to the first unit 12.

By way of nonlimiting example, reference will be made to the FR patent application No. 1251155 of the Applicant filed on Feb. 8, 2012 that describes and shows an element for gripping containers corresponding to the previously cited support means 20 and comprising a removable tip equipped with a mandrel and with an ejection plate.

Advantageously, said at least one robot 50 comprises at least second means 70 to help with the operations for changing molding means 30 belonging to the second unit 14.

By way of nonlimiting example, reference will be made to the document PCT/EP2012/053881 that describes and shows such means 70 that are particularly able to ensure the gripping and the transport of molding means 30.

Preferably, said first means and/or second means 70 of said at least one robot 50 are controlled selectively to perform automatically said operations for changing molding means 30 and/or said operations for changing support means 20 of the preforms 16.

Advantageously, said robot 50 has a hinged arm 72 that is mobile in the space in accordance with a trihedron (X, Y, Z).

Preferably, the free end of the arm 72 comprises first means associated with the support means 20 and/or second means 70 associated with the molding means 30.

However, the changes of tools such as the molding means 30 and/or the support means 20 constitute only nonlimiting examples of operations able to be performed by the robot 50 on one and/or the other of the units 12, 14 of the installation 10.

Actually, the robot 50 is further able to act to perform operations other than those cited changes, particularly to perform maintenance operations.

Advantageously, said at least one robot 50 is further used to perform other operations in the area 60.

By way of nonlimiting example, the robot 50 is used in the area 60 to handle tools included in the storage means 68 so as to perform operations on the tools such as the molding means 30 and/or the support means 20.

Preferably, treatment means (not shown) associated with said tools are placed in the area 60 to decontaminate said tools by destroying all or most of the pathogens that can be present on these tools.

Advantageously, the treatment means are able to perform a decontamination operation by irradiation (for example by application of ultraviolet radiation) and/or chemically (for example by application of hydrogen peroxide—H2O2).

Preferably, the treatment operations are performed by the robot 50 and by the treatment means concurrently, i.e., when the installation 10 is in the operating mode, known as production.

Advantageously, said at least one robot 50 acts to perform operations of decontamination of the molding means 30 and/or support means 20 that are intended to be changed then automatically by said robot 50.

FIGS. 2 and 3 illustrate an action example of the robot 50 on the second unit 14 (or blower) to perform automatically operations for changing the molding means 30 of all or part of the molding devices 26.

The storage means 68 placed in the area 60 beside the robot 50 comprise molding means 30 designed to be mounted in or removed from the molding devices 26.

Advantageously, said molding means 30 have been, as described above, previously decontaminated by treatment means with the aid of said at least one robot 50.

As shown, the robot 50 is advantageously a robot of the "4 axes" type, as a variant "6 axes."

To initiate a change in molding means 30, the installation 10 is stopped and switched from the operating mode, known as production, to the operating mode, known as servicing.

The closing means 56 are made here in the form of gates that are actuated, preferably automatically, to cause them to move from the closed position to the open position.

The second unit 14 is then made accessible to the arm 72 of the robot 50 through the opening 58, thanks to which the robot 50 is able to act through the second vertical lateral face F2 formed by the external face of the wall 40 of the enclosure 32.

The second means 70 located at the free end of the arm 72 of the robot 50 are then moved and positioned in the space to take hold of the molding means 30 and to transport them to the storage means 68.

New molding means 30 are then able to be grasped by the second means 70 to be mounted into the waiting molding device 26.

Preferably, the second means 70 are able to be easily separated from the arm 72 of the robot to enable the mounting of the first means (not shown) for acting on the support means 20 of the preforms in the oven 12 that forms the first unit.

As a variant, the first means and the second means 70 can coexist on the arm 72 of the robot 50.

To act through the first vertical lateral fact F1, the opening 54 must be cleared by initiating the opening, i.e., with movement of the closing means 52 from the closed position to the open position.

The invention claimed is:

1. Installation (10) for the production of containers (12), particularly bottles, from preforms (16) of thermoplastic material, said installation (10) comprising at least:
a first unit (12) for the thermal conditioning of the preforms (16) that comprises a first vertical lateral face (F1); and
a second unit (14) for forming the containers (24) from said thermally-conditioned preforms (16) in the first unit (12), which comprises a second vertical lateral face (F2);
characterized in that the installation (10) comprises at least one robot (50) that is placed opposite the first vertical lateral face (F1) and opposite the second vertical lateral face (F2) to act selectively through the first vertical lateral face (F1) and/or through the second vertical lateral face (F2) so as to perform operations on the first unit (12) and/or the second unit (14).

2. Installation according to claim 1, wherein said at least one robot (50) comprises at least first means to help with the operations for changing support means (20) of the preforms (16) belonging to the first unit (12).

3. Installation according to claim 1, wherein said at least one robot (50) comprises at least second means (70) to help with the operations for changing molding means (30) belonging to the second unit (14).

4. Installation according to claim 3, wherein said at least one robot (50) comprises at least first means to help with the operations for changing support means (20) of the preforms (16) belonging to the first unit (12), and a hinged arm (72) that is mobile in the space in accordance with a trihedron (X, Y, Z).

5. Installation according to claim 3, wherein said first means and/or the second means of said at least one robot (50) are controlled selectively to perform automatically said operations for changing the molding means (30) and/or said operations for changing the support means (20) of the preforms.

6. Installation according to claim 1, wherein the first vertical lateral face (F1) and the second vertical lateral face (F2) extend into the extension of one another.

7. Installation according to claim 1, wherein the first vertical lateral face (F1) is the external face of one (38) of the vertical walls of an enclosure (32) surrounding said first unit (12) and wherein the first vertical lateral face (F1) comprises closing means (52) that are mounted to move between a closed position and an open position, to clear selectively at least one opening (54) making possible the action of said at least one robot (50) on the first unit (12).

8. Installation according to claim 1, wherein the second vertical lateral face (F2) is the external face of one (40) of the vertical walls of an enclosure (32) surrounding said second unit (14) and wherein the second vertical lateral face (F2) comprises closing means (56) that are mounted to move between a closed position and an open position to clear selectively at least one opening (58) making possible the action of said at least one robot (50) on the second unit (14).

9. Installation according to claim 7, wherein the first vertical lateral face (F1) and the second vertical lateral face (F2) extend into the extension of one another, and said at least one robot (50) is installed in an area (60) delimited by an enclosure (62), said enclosure (62) comprising at least said walls (38, 40) that comprise respectively the first vertical lateral face (F1) and the second vertical lateral face (F2).

10. Installation according to claim 1, wherein said at least one robot (50) is able to be moved opposite the first vertical lateral face (F1) and/or the second vertical lateral face (F2).

* * * * *